United States Patent
Tsubaki (10) Patent No.: US 8,655,141 B2
(45) Date of Patent: Feb. 18, 2014

(54) VIDEO TRANSMISSION APPARATUS, VIDEO RECEIVING APPARATUS AND VIDEO TRANSMISSION SYSTEM

(75) Inventor: Satoshi Tsubaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 13/439,561

(22) Filed: Apr. 4, 2012

(65) Prior Publication Data
US 2012/0257867 A1 Oct. 11, 2012

(30) Foreign Application Priority Data
Apr. 8, 2011 (JP) .................. 2011-085853

(51) Int. Cl.
*H04N 5/765* (2006.01)
*H04N 5/91* (2006.01)

(52) U.S. Cl.
USPC ......................... 386/232; 386/326

(58) Field of Classification Search
USPC .................. 386/232, 326, 341, 239, 324, 337
See application file for complete search history.

(56) References Cited

U.S. PATENT DOCUMENTS
2013/0227376 A1* 8/2013 Hwang et al. ................. 714/776

FOREIGN PATENT DOCUMENTS

| JP | 8-18914 | 1/1996 |
|---|---|---|
| JP | 2001-218175 | 8/2001 |
| JP | 2009-296383 | 12/2009 |

* cited by examiner

*Primary Examiner* — Robert Chevalier
(74) *Attorney, Agent, or Firm* — Frommer Lawrence & Haug LLP; William S. Frommer (57) ABSTRACT

There is provided a video transmission apparatus including a signal conversion unit for converting a packet of a local area network for transferring data into data suitable for a non-compressed video signal based on a given standard, and a video synthesis unit for recording the data converted from the packet by the signal conversion unit in an available region of the non-compressed video signal.

11 Claims, 6 Drawing Sheets

VIDEO TRANSMISSION APPARATUS, VIDEO RECEIVING APPARATUS AND VIDEO TRANSMISSION SYSTEM

BACKGROUND

The present disclosure relates to a video transmission apparatus, a video receiving apparatus and a video transmission system.

A receiving system or an imaging system for an ultra high definition (HD) video signal exceeding a current HD signal, which is a video signal (an image signal) in which one frame is 1920 samples×1080 lines, is being developed. For example, an Ultra HD Television (UHDTV) standard, which is a next generation broadcasting system with a pixel number of 4 or 6 times the number of pixels of current HD, has been proposed and standardized in the International Telecommunication Union (ITU) and the Society of Motion Picture and Television Engineers (SMPTE). A video standard proposed in ITU or SMPTE is a video signal having 3840 samples×2160 lines or 7680 samples×4320 lines, which is a sample number and a line number of 2 or 4 times 1920 samples×1080 lines.

In recent years, a standard for transmitting a 1920 samples×1080 lines/60P signal, which is a frame rate of twice 1920 samples×1080 lines/30P(60I), or an HD video such as a digital cinema using a $3^{rd}$ generation serial digital interface (3G-SDI) is proposed in SMPTE425M. 3G-SDI level A defines 1080I/P that is transmitted in HD-SDI. Further, 3G-SDI level B is defined as a scheme of multiplexing two HD-SDIs. This is because a transmission rate in 3G-SDI is twice HD-SDI. A multiplexing number of audio data sampled at 48 kHz is a maximum of 16 ch per 1 ch of HD-SDI.

A technique of a signal transmission apparatus for serial transmission of a video signal defined in a 3G-SDI format and an audio signal synchronized to the video signal, a signal transmission method, a signal receiving apparatus, and a signal receiving method is disclosed in, for example, Japanese Patent Laid-open Publication No. 2009-296383.

SUMMARY

Use of 3G-SDI enables dual link input and output or transmission of two systems of video signals via one cable. However, in most systems in which a camera and a camera control unit (CCU) are connected via one cable, transmission of one system of video signal is sufficient, and a band for transferring one system of video signal is not effectively utilized.

Meanwhile, with the shift of peripheral devices of a camera to IT devices, control of the peripheral devices of the camera is generally performed through communication based on Ethernet (registered trademark). For example, when the peripheral devices connected to the camera are to be controlled from a CCU, it is necessary to connect them via a network cable separate from a camera cable.

A technique of converting a communication packet into a video signal standard is disclosed (e.g., see Japanese Patent Laid-open Publication Nos. Hei8-18914 and 2001-218175), but converting an Ethernet packet to be suitable for the HD-SDI or 3G-SDI standard, recording the converted data in an available region of a video signal of the HD-SDI or 3G-SDI standard, and then transmitting the packet are not performed.

The present disclosure has been made in view of the circumstances described above, and an object of the present disclosure is to provide a video transmission apparatus, a video receiving apparatus, and a video transmission system that are novel and enhanced and capable of converting a packet of a local area network for transferring data, such as Ethernet, to be suitable for a given video standard, recording the converted data in an available region of a video signal of the video standard, and transmitting the packet.

According to the present disclosure, there is provided a video transmission apparatus including a signal conversion unit for converting a packet of a local area network for transferring data into data suitable for a non-compressed video signal based on a given standard, and a video synthesis unit for recording the data converted from the packet by the signal conversion unit in an available region of the non-compressed video signal.

According to the present disclosure, a signal conversion unit converts a packet of a local area network for transferring data into data suitable for a non-compressed video signal based on a given standard. A video synthesis unit records the data converted from the packet by the signal conversion unit in an available region of the non-compressed video signal.

According to the present disclosure, there is provided a video receiving apparatus including a video signal receiving unit for receiving a non-compressed video signal based on a given standard, a data acquisition unit for acquiring data obtained by converting a packet of a local area network for transferring data to be suitable for the non-compressed video signal based on the given standard, from the non-compressed video signal received by the video signal receiving unit, and a packet conversion unit for converting the data acquired by the data acquisition unit into the packet of the local area network for transferring data.

According to the present disclosure, there is provided a video transmission system including a video transmission apparatus for transmitting a non-compressed video signal based on a given standard, and a video receiving apparatus for receiving the non-compressed video signal based on a given standard transmitted by the video transmission apparatus. The video transmission apparatus includes a signal conversion unit for converting a packet of a local area network for transferring data into data suitable for the non-compressed video signal based on the given standard, and a video synthesis unit for recording the data converted from the packet by the signal conversion unit in an available region of the non-compressed video signal, and the video receiving apparatus includes a video signal receiving unit for receiving the non-compressed video signal based on the given standard, a data acquisition unit for acquiring data obtained by converting the packet of the local area network to be suitable for the non-compressed video signal based, on the given standard, from the non-compressed video signal received by the video signal receiving unit, and a packet conversion unit for converting the data acquired by the data acquisition unit into the packet of the local area network.

As described above, according to the present disclosure, it is possible to provide a video transmission apparatus, a video receiving apparatus, and a video transmission system that are novel and enhanced and capable of converting a packet of a local area network for transferring data, such as Ethernet, to be suitable for a given video standard, recording the converted data in an available region of a video signal of the video standard, and transmitting the packet.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order.
<1. First Embodiment of the Present Disclosure>
[1-1. Configuration of Video System]
[1-2. Functional Configuration of Imaging Device and CCU]
[1-3. Operation of Imaging Device and CCU]
<2. Conclusion>

1. AN EMBODIMENT OF THE PRESENT DISCLOSURE

1-1. Configuration of Image System

Figure 1:
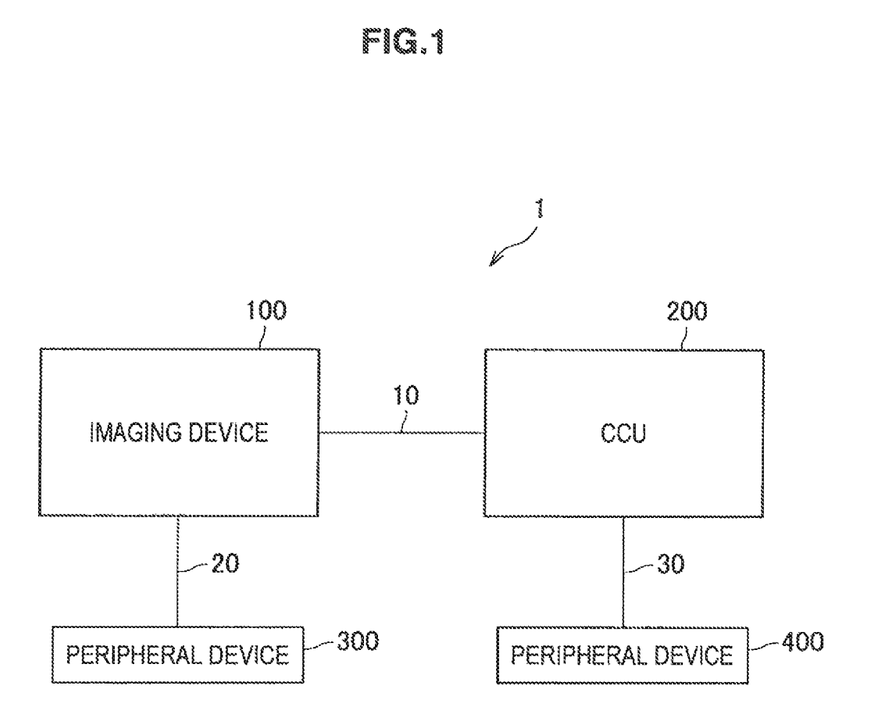
FIG. 1 is an illustrative diagram showing a configuration of a video system 1 according to an embodiment of the present disclosure.

First, a configuration of a video system according to an embodiment of the present disclosure will be described with reference to the accompanying drawings. FIG. 1 is an illustrative diagram showing a configuration of a video system 1 according to the embodiment of the present disclosure. Hereinafter, the configuration of the video system 1 according to the embodiment of the present disclosure will be described with reference to FIG. 1.

As shown in FIG. 1, the video system 1 according to the embodiment of the present disclosure includes an imaging device 100 and a CCU (Camera Control Unit) 200. The imaging device 100 and the CCU 200 are connected to each other via video cable 10. The video cable 10 may include, for example, an optical fiber cable. The video cable 10 corresponds to, HD-SDI or 3G-SDI. The connection of the imaging device 100 with the CCU 200 via the video cable 10 enables dual, link input and output of a video or transmission of two systems of video signals between the imaging device 100 and the CCU 200.

The imaging device 100 images a subject and generates a video signal according to the imaging result, which is complied with HD-SDI or 3G-SDI standard. The imaging device 100 generates, as the video signal, a 1080i signal, 720P signal, 1080P signal or a 1080I/4:4:4 signal. The imaging device 100 generates, as the 1080i, 720P signal or the 1080I/4:4:4 signal, an m-bit quantization signal for broadcast (m is 10 or 12). The video signal generated by the imaging device 100 is transmitted to the CCU 200 via the video cable 10 without being compressed. The imaging device 100 functions as a video transmission device for transmitting the non-compressed video signal.

As shown in FIG. 1, a peripheral device 300 may be connected to the imaging device 100. A peripheral device 400 may be connected to the CCU 200. The imaging device 100 and the peripheral device 300 are connected to each other via an Ethernet cable 20 such that an operation of the peripheral device 300 can be controlled from the imaging device 100. Similarly, the CCU 200 and the peripheral device 400 are connected to each other via an Ethernet cable 30 such that an operation of the peripheral device 400 can be Controlled from the CCU 200. Further, the peripheral device 300 and the peripheral device 400 forms a communication path therebetween using the Ethernet cable 20, the video cable 10, and the Ethernet cable 30, such that packet communication can be realized between the peripheral device 300 and the peripheral device 400.

Only one imaging device 100 is shown in FIG. 1, but it is understood that the present disclosure is not limited to such an example and a plurality of imaging devices 100 may be connected to the CCU 200 via separate video cables 10. Further, a state in which the peripheral device 300 is connected to only the imaging device 100 is shown in FIG. 1, but it is understood that the present disclosure is not limited to such an example, and the peripheral device may also be connected to the CCU 200 or may be connected to only the CCU 200.

The CCU 200 is a unit for controlling the imaging device 100, receiving a video signal complied with HD-SDI or 3G-SDI standard from the imaging device 100, or transmitting a video signal (return video) for causing a monitor of an imaging device 100 to display a video of other imaging devices or a video currently broadcasting using another imaging device 100 when there are a plurality of imaging devices 100. The CCU 200 functions as a video receiving device for receiving the video signal from the imaging device 100.

The configuration of the video system 1 according to an embodiment of the present disclosure has been described above with reference to FIG. 1. Next, functional configurations of the imaging device 100 and the CCU 200 according to an embodiment of the present disclosure will be described.

1-2. Functional Configuration of Imaging Device and CCU

Figure 2:
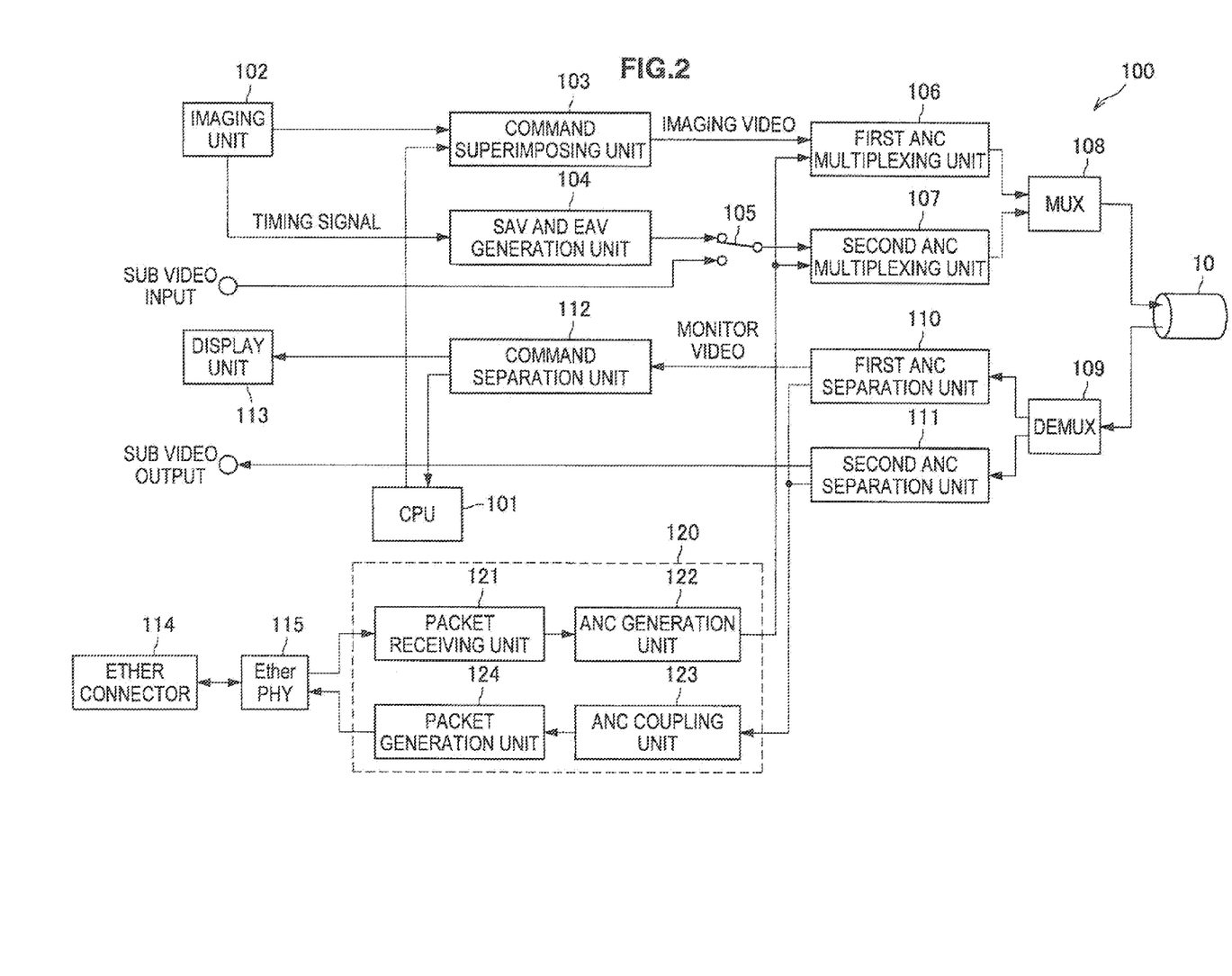
FIG. 2 is an illustrative diagram showing a functional configuration of an imaging device 100 according to an embodiment of the present disclosure.

FIG. 2 is an illustrative diagram showing a functional configuration of an imaging device 100 according to an embodiment of the present disclosure. Hereinafter, the functional configuration of the imaging device 100 according to an embodiment of the present disclosure will be described with reference to FIG. 2.

As shown in FIG. 2, the imaging device 100 according to an embodiment of the present disclosure includes a central processing unit (CPU) 101, an imaging unit 102, a command superimposing unit 103, a start of active video (SAV) and end of active video (EAV) generation unit 104, a switch 105, a first ancillary (ANC) multiplexing unit 106, a second ANC multiplexing unit 107, a multiplexer (MUX) 108, a demultiplexer (DEMUX) 109, a first ANC separation unit 110, a second ANC separation unit 111, a command separation unit 112, a display unit 113, an Ether connector 114, an Ether PHY 115, and a packet conversion unit 120. The packet conversion unit 120 includes a packet receiving unit 121, an ANC generation unit 122, an ANC coupling unit 123, and a packet generation unit 124.

The CPU 101 controls an operation of the imaging device 100. The imaging unit 102 performs photographing of a subject and generates a video signal resulting from the photographing. The imaging unit 102 includes an imaging element such as a CCD image sensor or a CMOS image sensor, and the imaging element generates the video signal. The imaging unit 102 outputs the generated video signal to the command superimposing unit 103 and outputs a timing signal generated according to the output video signal to the SAV and EAV generation unit 104.

The command superimposing unit 103 superimposes a given command transmitted from the imaging device 100 to the CCU 200 on the video signal generated by the imaging unit 102. The given command superimposed by the command superimposing unit 103 is generated by the CPU 101. The command superimposing unit 103 superimposes data corresponding to the command generated by the CPU 101 on a given region defined by an HD-SDI standard, of the video signal. The video signal on which the command has been superimposed by the command superimposing unit 103 is output to the first ANC multiplexing unit 106.

The SAV and EAV generation unit 104 generates a code SAV for indicating a start of an active video region and separating an active video region and an ancillary data region which will be described later, and a code EAV for indicating an end of the active video region and separating an active video region and an ANC data region. The SAV and EAV generation unit 104 generates the SAV and the EAV based on the timing signal generated by the imaging unit 102. As the SAV and EAV generation unit 104 generates the code SAV and EAV, the signal output from the SAV and EAV generation unit 104 can be recognized as the same signal as the video signal of an HD-SDI standard. A signal including the SAV and the EAV generated by the SAV and EAV generation unit 104 is output to the second ANC multiplexing unit 107.

The switch 105 switches between the signal including the SAV and the EAV generated by the SAV and EAV generation unit 104 and a video signal transmitted from a sub video input terminal, as a signal to be output to the second ANC multiplexing unit 107, which will be described later.

The first ANC multiplexing unit 106 superimposes ANC data converted from an Ethernet packet by the packet conversion unit 120 on a region having no data in a blanking region of the video signal output from the command superimposing unit 103. The video signal on which the ANC data output from the packet conversion unit 120 has been superimposed by the first ANC multiplexing unit 106 is output to the MUX 108.

The second ANC multiplexing unit 107 superimposes the ANC data converted from the Ethernet packet by the packet conversion unit 120 on the signal output from the SAV and EAV generation unit 104. The video signal on which the ANC data output from the packet conversion unit 120 has been superimposed by the second ANC multiplexing unit 107 is output to the MUX 108.

The MUX 108 multiplexes the signals output from the first ANC multiplexing unit 106 and the second ANC multiplexing unit 107 in order to transmit the signals to the CCU 200 using one video cable 10. The signal multiplexed by the MUX 108 is transmitted to the CCU 200 via the video cable 10.

The DEMUX 109 separates and outputs two signals transmitted from the CCU 200 via the video cable 10. The DEMUX 109 separates the signals transmitted from the CCU 200 and outputs the signals to the first ANC separation unit 110 and the second ANC separation unit 111, respectively.

The first ANC separation unit 110 separates the ANC data from the signal separated by the DEMUX 109. The ANC data separated by the first ANC separation unit 110 is output to the packet conversion unit 120. Further, the signal after the first ANC separation unit 110 separates the ANC data is output as a monitor video signal to be displayed as a video on the display unit 113, which will be described later, to the command separation unit 112.

The second ANC separation unit 111 separates the ANC data from the signal separated by the DEMUX 109. The ANC data separated by the second ANC separation unit 111 is output to the packet conversion unit 120. Further, when video data is included in the signal after the second ANC separation unit 111 separates the ANC data, the video data is output as a monitor video signal to be displayed on an external monitor connected to the sub video output terminal, to the sub video output terminal.

The command separation unit 112 separates a command included in the monitor video signal output from the first ANC separation unit 110. The command separated from the monitor video signal by the command separation unit 112 is output to the CPU 101. The CPU 101 can perform a process based on the command separated by the command separation unit 112. Further, the monitor video signal from which the command has been separated by the command separation unit 112 is output to the display unit 113.

The display unit 113 displays a video based on the monitor video signal output from the command separation unit 112. The display unit 113 includes, for example, a liquid crystal monitor.

The Ether connector 114 is a connector for connecting an Ethernet cable 20 to the imaging device 100. Connection of the Ethernet cable 20 to the Ether connector 114 enables Ethernet communication between the imaging device 100 and the peripheral device 300. The Ether PHY 115 is a device that performs conversion between data and an electrical signal.

The packet receiving unit 121 receives the Ethernet packet transmitted from the Ether PHY 115. The packet receiving unit 121 outputs the received packet to the ANC generation unit 122.

The ANC generation unit 122 converts the Ethernet packet received by the packet receiving unit 121 into ANC data to generate the ANC data. A method of converting the Ethernet, packet into the ANC data will be described in detail later.

The ANC coupling unit 123 couples the ANC data output from the first ANC separation unit 110 and the second ANC separation unit 111. The packet generation unit 124 generates an Ethernet packet from the ANC data coupled by the ANC coupling unit 123. The Ethernet packet generated by the packet generation unit 124 is converted into an electrical signal by the Ether PHY 115 and transmitted to the peripheral device 300 via the Ethernet cable 20 connected to the Ether connector 114. A method of converting the ANC data into the Ethernet packet will be described in detail later.

The functional configuration of the imaging device 100 according to an embodiment of the present disclosure has been described above with reference to FIG. 2. Next, a functional configuration of the CCU 200 according to an embodiment of the present disclosure will be described.

Figure 3:
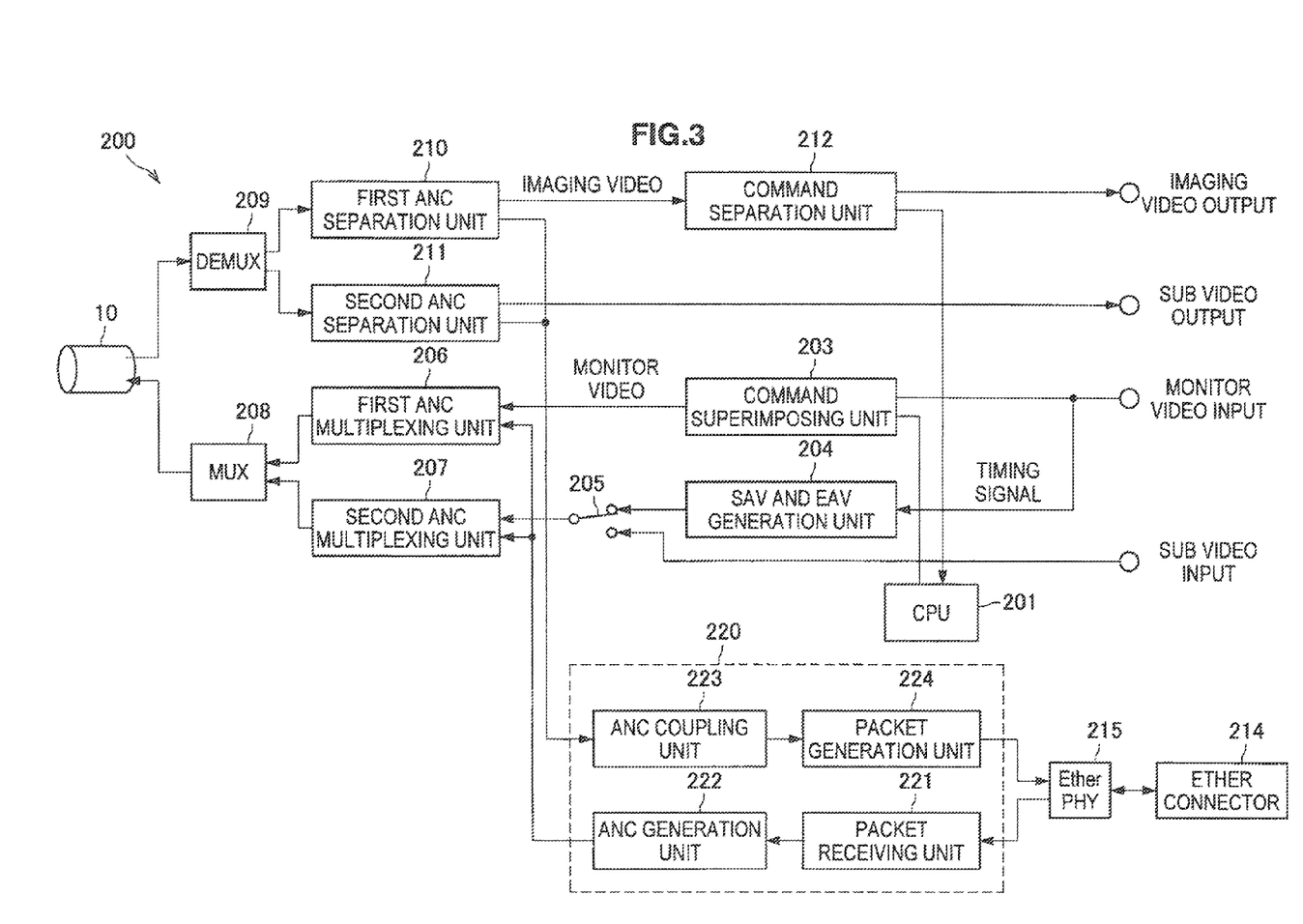
FIG. 3 is an illustrative diagram showing a functional configuration of a CCU 200 according to an embodiment of the present disclosure.

FIG. 3 is an illustrative diagram showing a functional configuration of the CCU 200 according to an embodiment of the present disclosure. Hereinafter, the functional configuration of the CCU 200 according to an embodiment of the present disclosure will be described with reference to FIG. 3.

As shown in FIG. 3, the CCU 200 according to an embodiment of the present disclosure includes a CPU 201, a command superimposing unit 203, a SAV and EAV generation unit 204, a switch 205, a first ANC multiplexing unit 206, a second ANC multiplexing unit 207, a MUX 208, a DEMUX 209, a first ANC separation unit 210, a second ANC separation unit 211, a command separation unit 212, an Ether connector 214, an Ether PHY 215, and a packet conversion unit 220. The packet conversion unit 220 includes a packet receiving unit 221, an ANC generation unit 222, an ANC coupling unit 223, and a packet generation unit 224.

The CPU 201 controls an operation of the CCU 200. The command superimposing unit 203 superimposes a given command transmitted from the CCU 200 to the imaging device 100 on a video signal transmitted from a monitor video input terminal. The given command superimposed by the command superimposing unit 203 is generated by the CPU 201. The command superimposing unit 203 superimposes data corresponding to the command generated by the CPU 201 on a given region defined by the HD-SDI standard, of the video signal. The video signal on which the command has been superimposed by the command superimposing unit 203 is output to the first ANC multiplexing unit 206.

The SAV and EAV generation unit 204 generates a code SAV and, a code EAV. The SAV and EAV generation unit 204 generates the SAV and the EAV based on a timing signal generated according to the input terminal video signal transmitted from the monitor video. As the SAV and EAV generation unit 204 generates the code SAV and the code EAV, the signal output from the SAV and EAV generation unit 204 can be recognized as the same signal as a video signal of an HD-SDI standard. A signal including the code SAV and code EAV generated by the SAV and EAV generation unit 204 is output to the second ANC multiplexing unit 207.

The switch 205 switches between the signal including the SAV and the EAV generated by the SAV and EAV generation unit 204 and the video signal transmitted from the sub video input terminal, as a signal to be output to the second ANC multiplexing unit 207, which will be described later.

The first ANC multiplexing unit 206 superimposes ANC data converted from the Ethernet packet by the packet conversion unit 220 on a region having no data in a blanking region of the video signal output from the command superimposing unit 203. The video signal on which the ANC data output from the packet conversion unit 220 has been superimposed by the first ANC multiplexing unit 206 is output to the MUX 208.

The second ANC multiplexing unit 207 superimposes the ANC data converted from the Ethernet packet by the packet conversion unit 220 on the signal output from the SAV and EAV generation unit 104. A video signal on which the ANC data output from the packet conversion unit 220 has been superimposed by the second ANC multiplexing unit 207 is output to the MUX 208.

The MUX 208 multiplexes the signals output from the first ANC multiplexing unit 206 and the second ANC multiplexing unit 207 to transmit the signals to the imaging device 100 via one video cable 10. The signal multiplexed by the MUX 208 is transmitted to the imaging device 100 via the video cable 10.

The DEMUX 209 separates and outputs the two signals transmitted from the imaging device 100 via the video cable 10. The DEMUX 209 separates the signals transmitted from the imaging device 100 and outputs the signals to the first ANC separation unit 210 and the second ANC separation unit 211, respectively.

The first ANC separation unit 210 separates ANC data from the signal separated by the DEMUX 209. The ANC data separated by the first ANC separation unit 210 is output to the packet conversion unit 220. Further, a signal after the first ANC separation unit 210 separates the ANC data is output as an imaging video signal to be output from an imaging video output terminal, to the command separation unit 212.

The second ANC separation unit 211 separates ANC data from the signal separated by the DEMUX 209. The ANC data separated by the second ANC separation unit 211 is output to the packet conversion unit 220. Further, when video data is included in a signal after the second ANC separation unit 211 separates the ANC data, the video data is output, as a monitor video signal for being displayed on an external monitor connected to the sub video output terminal, to the sub video output terminal.

The Ether connector 214 is a connector for connecting an Ethernet cable 30 to the CCU 200. The connection of the Ethernet cable 30 to the Ether connector 214 enables Ethernet communication between the imaging device 100, and the CCU 200 and the peripheral device 400 connected to the CCU 200. The Ether PHY 215 is a device that performs conversion between data and an electrical signal.

The packet receiving unit 221 receives a packet transmitted from the Ether PHY 215. The packet receiving unit 221 outputs the received packet to the ANC generation unit 222.

The ANC generation unit 222 converts the Ethernet packet received by the packet receiving unit 221 into the ANC data to generate the ANC data. A method of converting the Ethernet packet into the ANC data will be described in detail later.

The ANC coupling unit 223 couples the ANC data output from the first ANC separation unit 210 and the second ANC separation unit 211. The packet generation unit 224 generates an Ethernet packet from the ANC data coupled by the ANC coupling unit 223. The Ethernet packet generated by the packet generation unit 224 is converted into an electrical signal by the Ether PHY 215 and transmitted to the peripheral device via the Ethernet cable connected to the Ether connector 214. A method of converting the ANC data into the Ethernet packet will be described in detail later.

A functional configuration of the CCU 200 according to an embodiment of the present disclosure has been described above with reference to FIG. 3. Next, an operation of the imaging device 100 and the CCU 200 according to an embodiment of the present disclosure will be described.

1-3. Operation of Imaging Device and CCU

Figure 4:
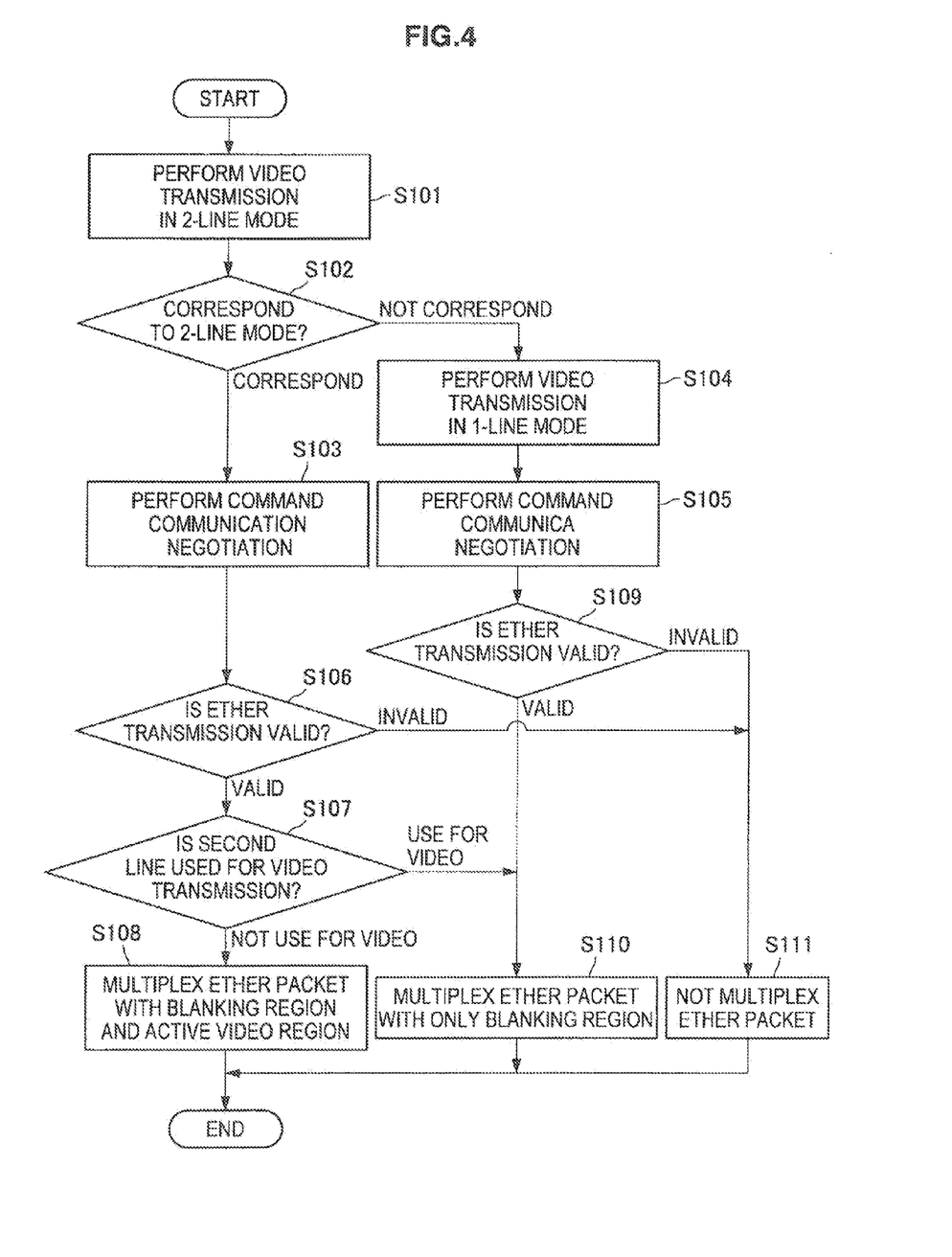
FIG. 4 is a flow diagram showing an operation of the imaging device 100 according to an embodiment of the present disclosure.

FIG. 4 is a flow diagram showing an operation of an imaging device 100 according to an embodiment of the present disclosure. Hereinafter, an operation of an imaging device 100 according to an embodiment of the present disclosure will be described with reference to FIG. 4.

A flow diagram shown in FIG. 4 shows a process in a case in which an Ethernet packet is superimposed on a video signal and then transmitted when a video is transmitted from the imaging device 100 to the CCU 200. The imaging device 100 confirms that transmission of two systems of video signals in a 2-line mode, that is, via the video cable 10 is performed (step S101).

The imaging device 100 judges whether the CCU 200 connected via the video cable 10 corresponds to the 2-line mode through transmission and reception of a command to and from the CCU 200 (step S102). The judgment is performed by the CPU 101.

If it is judged in step S102 that the CCU 200 corresponds to the 2-line mode, the imaging device 100 performs command communication negotiation with the CCU 200 (step S103). The command communication in step S103 is performed as the CPU 101 generates the command, the command superimposing unit 103 superimposes the command on the video signal, and the resultant video signal is transmitted from the imaging device 100 to the CCU 200.

On the other hand, if it is judged in step S102 that the CCU 200 does not correspond to the 2-line mode, the imaging device 100 confirms that transmission of one system of video signal in a 1-line mode, that is, via the video cable 10, is performed (step S104). When the imaging device 100 confirms that the transmission of a video signal in a 1-line mode is performed, the imaging device 100 performs command communication negotiation with the CCU 200 (step S105). The command communication in step S105 is performed similarly to the command communication in step S103.

If the imaging device 100 performs the command communication negotiation with the CCU 200 in step S103, then the imaging device 100 judges whether Ethernet transmission with the CCU 200 (Ether transmission) is valid (step S106). This judgment as to whether the Ethernet transmission with the CCU 200 is valid is made, for example, by the CPU 101 judging whether the CCU 200 has a function of converting the packet data superimposed on, the video signal into a packet through the command communication in step S103.

If the imaging device 100 judges in step S106 that Ethernet transmission with the CCU 200 is valid, then the imaging device 100 judges whether a second line among two lines for video signal transmission is to be used for video transmission (step S107). The judgment as to whether the second line is to be used for video transmission may be made, for example, based on whether the video signal is transmitted from the sub video input terminal of the imaging device 100 and the switch 105 is connected to the sub video input terminal rather than the SAV and EAV generation unit 104 according to settings of the imaging device 100.

If the imaging device 100 judges in step S107 that the second line is not used for video transmission, the second ANC multiplexing unit 107 multiplexes the Ether packet with the blanking region and the active video region in the video signal of the second line (step S108).

On the other hand, if the video transmission between the imaging device 100 and the CCU 200 does not correspond to the 2-line mode and if the imaging device 100 performs the command communication negotiation with the CCU 200 in step S105, then the imaging device 100 judges whether the Ethernet transmission with the CCU 200 is valid (step S109). This judgment as to whether Ethernet transmission with the CCU 200 is valid is made, for example, by the CPU 101 judging whether the CCU 200 has a function of converting the packet data superimposed on the video signal into a packet through the command communication in step S105, similar to the judgment in step S106.

If the imaging device 100 judges in step S107 that the second line is used for video transmission and judges in step S109 that the Ethernet transmission with the CCU 200 is valid, the Ethernet packet is multiplexed with only the blanking region in the video signal (step S111).

Further, if the imaging device 100 judges in steps S106 and S109 that the Ethernet transmission with the CCU 200 is invalid, the imaging device 100 does not multiplex the Ethernet packet with the video signal (step S112).

Figure 5:
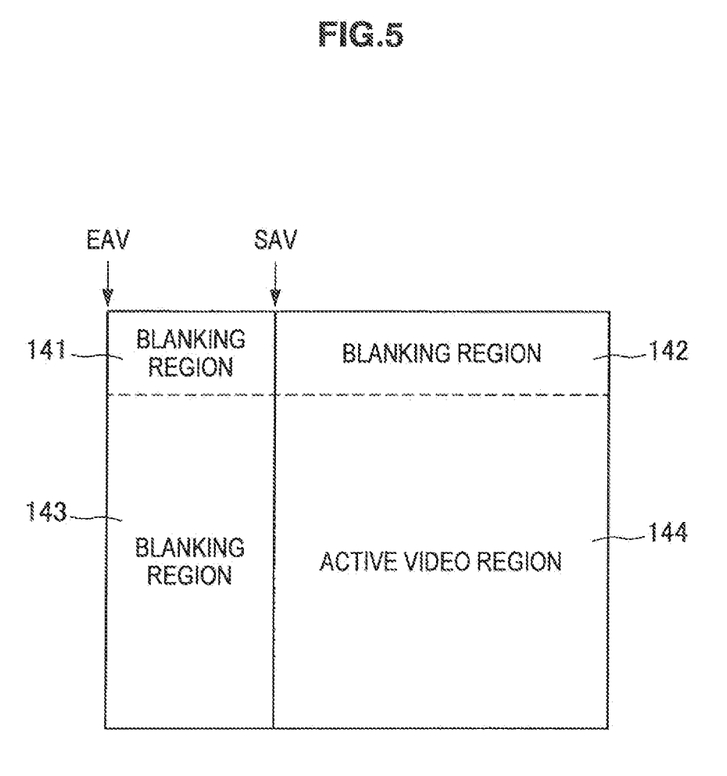
FIG. 5 is an illustrative diagram showing a blanking region and an active video region in the HD-SDI standard.

Here, the blanking region and the active video region will be described. FIG. 5 is an illustrative diagram showing the blanking region and the active video region in a frame structure of the HD-SDI standard. In the HD-SDI standard, blanking regions 141, 142, and 143 and an active video region 144 are provided, as shown in FIG. 5.

If the imaging device 100 judges in step S107 that the second line is not used for video transmission, the second ANC multiplexing unit 107 leaves, the EAV and the SAV and places the Ether packet in places where ANC may be placed, of the blanking regions 141, 142, and 143 and the active video region 144, in a format of the ANC.

3G-SDI is capable of transmitting video signals in two systems. Hereinafter, a first video is referred to as a primary video and a second video signal is referred to as a secondary video. The primary video is used to transmit a video obtained by photographing, as in a related art, and the secondary video is used to transmit the video signal or to place and transmit the Ether packet. A method of placing the Ether packet in the secondary video and transmitting the packet will be described hereinafter.

As defined in SMPTE-424M, which is an SDI standard issued by the Society of Motion Picture and Television Engineers (SMPTE), 3G-SDI generally has a structure in which the primary video and the secondary video are alternately input. When data having no synchronization signal is placed in the secondary video, a synchronization signal is difficult to extract by pattern matching. Further, when the video signal is input into the secondary video, a synchronization signal is positively necessary. Thereby, a synchronization signal (EAV and SAV) is input into the secondary video, and an Ether packet is input into a part other than the synchronization signal. When there is a video signal in the secondary video, it is necessary for data to take a format of ANC.

Figure 6:
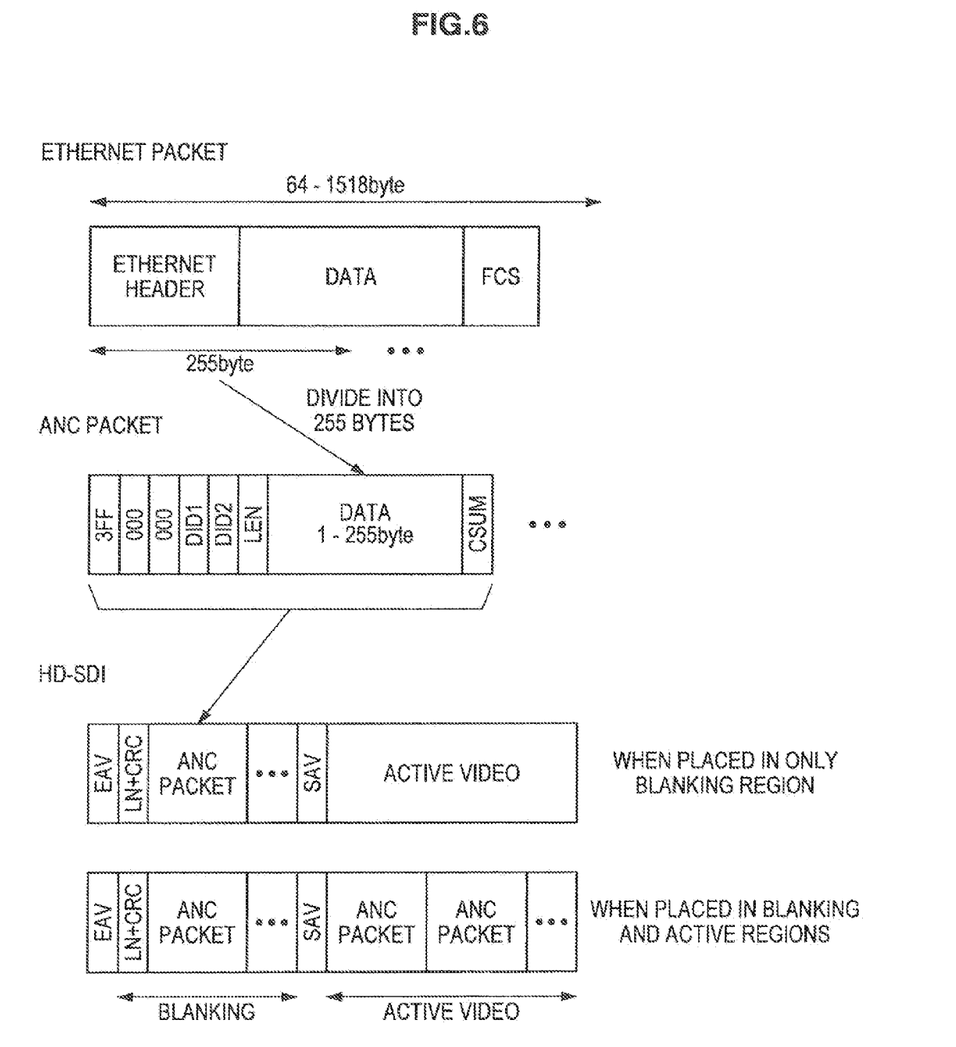
FIG. 6 is an illustrative diagram showing a flow when an Ethernet packet is converted into an ANC packet.

FIG. 6 is an illustrative diagram showing a flow when an Ethernet packet is converted into an ANC packet. The Ethernet packet includes an Ethernet header, data, and a frame check sequence (FCS), and has a data length of 64 to 1518 bytes. An ANC structure is capable of transmitting data of a maximum of 255 bytes, as shown in a middle of FIG. 6. Thereby, the ANC generation unit 122 divides the Ethernet packet received by the packet receiving unit 121 into 255 bytes and sets the packet in ANC data to thereby generate the ANC packet.

When the ANC packet is placed in the blanking region and the active video region, the second ANC multiplexing unit 107 places the ANC packet in both the blanking region and the active video region, as shown in a lower part of FIG. 6. On the other hand, when the ANC packet is placed in only the blanking region, the second ANC multiplexing unit 107 places the ANC packet only in the blanking region.

A seamless system can be realized only by changing a placement position of the ANC packet in setting whether the video signal is input into the secondary video. Furthermore, there is an advantage in that it is unnecessary to set an IP address between the imaging device 100 and the CCU 200 since it looks like it is via an Ethernet repeater. Further, in communication between the imaging device 100 and the CCU 200, it is possible to easily adapt to one of the imaging device 100 and the CCU 200 having a lower communication speed (corresponding to only video transmission based on 1 system).

Thus, the ANC packet is extracted from the video signal having the ANC packet placed therein by the CCU 200. The extracted ANC packet is converted into the Ethernet packet by the CCU 200. When the ANC packet is converted into the Ethernet packet, the ANC packets are coupled to generate the Ethernet packet, conversely to the conversion from the Ethernet packet to the ANC packet.

Accordingly, when the ANC generation unit 122 performs conversion of the Ethernet packet into the ANC packet, the ANC generation unit 122 may describe, in the ANC packet, the number of ANC packets generated from one Ethernet packet and numbers (serial numbers) of the ANC packets. The ANC generation unit 122 may describe information of the number of ANC packets and packet numbers in, for example, "DID2 (Data ID 2)" of the ANC packet in FIG. 6. Since "DID2" has a length of 8 bytes, the ANC generation unit 122 may describe, for example, the number of ANC packets in a first half of 4 bytes and the packet numbers in a second half of 4 bytes. The ANC coupling unit 223 couples the ANC packets in order using the information of the number of ANC packets and packet numbers described in "DID2."

The operation of the imaging device 100 according to an embodiment of the present disclosure has been described above with reference to FIG. 4. In the above description, the operation when the Ethernet packet is transmitted from the imaging device 100 to the CCU 200 is shown, but it is understood that the transmission of the Ethernet packet can be realized through the same operation even when the Ethernet packet is transmitted from the CCU 200 to the imaging device 100.

2. CONCLUSION

As described above, according to the embodiment of the present disclosure, the transmission of the Ethernet packet via the video cable 10 between the imaging device 100 and CCU 200 is realized. In transmission of the Ethernet packet via the video cable 10, the imaging device 100 and the CCU 200 perform conversion from the Ethernet packet to the ANC packet and place the ANC packet in a region not used for video transmission in the video signal. The imaging device 100 and the CCU 200 receiving the ANC packets can convert the ANC packets into an original Ethernet packet by extracting the ANC packets placed in the video signal and coupling the ANC packets in order.

Thus, according to the embodiment of the present disclosure, the transmission of the video signal and the Ethernet packet using one video cable 10 between the imaging device 100 and CCU 200 is realized, it is unnecessary to connect the imaging device 100 with the CCU 200 via a separate network cable for transmission of the Ethernet packet, and the transmission of the Ethernet packet between the imaging device 100 and the CCU 200 can be realized while maintaining portability of the imaging device 100. In the embodiment of the present disclosure, a communication path is established between the peripheral device 300 connected to the imaging device 100 and the peripheral device 400 connected to the CCU 200 via the Ethernet cable 20, the video cable 10, and the Ethernet cable 30. Packet communication between the peripheral device 300 and the peripheral device 400 via the communication path is realized without a network cable other than the video cable 10.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A video transmission apparatus including:

a signal conversion unit for converting a packet of a local area network for transferring data into data suitable for a non-compressed video signal based on a given standard; and a video synthesis unit for recording the data converted from the packet by the signal conversion unit in an available region of the non-compressed video signal.

(2)

The video transmission apparatus according to (1), wherein the signal conversion unit includes:

a packet receiving unit for receiving the packet; and a data generation unit for separating the received packet by a given length and generating the data suitable for the non-compressed video signal based on the given standard.

(3)

The video transmission apparatus according to (1) or (2), wherein:

the given standard is high definition-serial digital interface (HD-SDI).

(4)

The video transmission apparatus according to (1) (2), wherein:

the given standard is 3G-SDI.

(5)

The video transmission apparatus according, to any one of (1) to (4), wherein:

the packet converted by the signal conversion unit is an Ethernet packet.

(6)

The video transmission apparatus according to any one of (1) to (5), wherein:

the video synthesis unit determines a recording destination for the data based on communication with a transmission destination device.

(7)

A video receiving apparatus including:

a video signal receiving unit for receiving a non-compressed video signal based on a given standard;

a data acquisition unit for acquiring data obtained by converting a packet of a local area network for transferring data to be suitable for the non-compressed video signal based on the given standard, from the non-compressed video signal received by the video signal receiving unit; and a packet conversion unit for converting the data acquired by the data acquisition unit into the packet of the network for transferring data.

(8)

The video receiving apparatus according to (7), wherein:

the packet conversion unit converts the data acquired by the data acquisition unit into the packet of the network for transferring data by coupling the data acquired by the data acquisition unit and generating the packet of the network.

(9)

The video receiving apparatus according to (7) or (8), wherein:

the given standard is high definition-serial digital interface (HD-SDI).

(10)

The video receiving apparatus according to (7) or (8), wherein:

the given standard is 3G-SDI.

(11)

A video transmission system including a video transmission apparatus for transmitting a non-compressed video signal based on a given standard, and a video receiving apparatus for receiving the non-compressed video signal based on a given standard transmitted by the video transmission apparatus, wherein:

the video transmission apparatus includes:

a signal conversion unit for converting a packet of a local area network for transferring data into data suitable for the non-compressed video signal based on the given standard; and a video synthesis unit for recording the data converted from the packet by the signal conversion unit in an available region of the non-compressed video signal, and the video receiving apparatus includes:

a video signal receiving unit for receiving the non-compressed video signal based on the given standard;

a data acquisition unit for acquiring data obtained by converting the packet of the local area network to be suitable for the video signal based on the given standard, from the non-compressed video signal received by the video signal receiving unit; and The present disclosure contains subject matter related to that disclosed in Japanese Priority Patent Application JP 2011-085853 filed in the Japan Patent Office on Apr. 8, 2011, the entire content of which is hereby incorporated by reference.

What is claimed is:

1. A video transmission apparatus comprising:
    a signal conversion unit for converting a packet of a local area network for transferring data into data suitable for a non-compressed video signal based on a given standard; and
    a video synthesis unit for recording the data converted from the packet by the signal conversion unit in an available region of the non-compressed video signal.

2. The video transmission apparatus according to claim 1, wherein the signal conversion unit comprises:
    a packet receiving unit for receiving the packet; and
    a data generation unit for separating the received packet by a given length and generating the data suitable for the non-compressed video signal based on the given standard.

3. The video transmission apparatus according to claim 1, wherein:
    the given standard is high definition-serial digital interface (HD-SDI).

4. The video transmission apparatus according to claim 1, wherein:
    the given standard is 3G-SDI.

5. The video transmission apparatus according to claim 1, wherein:
    the packet converted by the signal conversion unit is an Ethernet packet.

6. The video transmission apparatus according to claim 1, wherein:
    the video synthesis unit determines a recording destination for the data based on communication with a transmission destination device.

7. A video receiving apparatus comprising:
    a video signal receiving unit for receiving a non-compressed video signal based on a given standard;
    a data acquisition unit for acquiring data obtained by converting a packet of a local area network for transferring data to be suitable for the non-compressed video signal based on the given standard, from the non-compressed video signal received by the video signal receiving unit; and
    a packet conversion unit for converting the data acquired by the data acquisition unit into the packet of the network for transferring data.

8. The video receiving apparatus according to claim 7, wherein:
    the packet conversion unit converts the data acquired by the data acquisition unit into the packet of the network for transferring data by coupling the data acquired by the data acquisition unit and generating the packet of the network.

9. The video receiving apparatus according to claim 7, wherein:
    the given standard is high definition-serial digital interface (HD-SDI).

10. The video receiving apparatus according to claim 7, wherein:
    the given standard is 3G-SDI.

11. A video transmission system comprising a video transmission apparatus for transmitting a non-compressed video signal based on a given standard, and a video receiving apparatus for receiving the non-compressed video signal based on a given standard transmitted by the video transmission apparatus, wherein:
    the video transmission apparatus includes:
    a signal conversion unit for converting a packet of a local area network for transferring data into data suitable for the non-compressed video signal based on the given standard; and
    a video synthesis unit for recording the data converted from the packet by the signal conversion unit in an available region of the non-compressed video signal, and
    the video receiving apparatus includes:
    a video signal receiving unit for receiving the non-compressed video signal based on the given standard;
    a data acquisition unit for acquiring data obtained by converting the packet of the local area network to be suitable for the video signal based on the given standard, from the non-compressed video signal received by the video signal receiving unit; and
    a packet conversion unit for converting the data acquired by the data acquisition unit into the packet of the local area network.

* * * * *